United States Patent [19]

Hayashi et al.

[11] Patent Number: 5,079,279

[45] Date of Patent: * Jan. 7, 1992

[54] REACTION CURABLE RESIN COMPOSITION AND ARTIFICIAL MARBLE

[75] Inventors: Takao Hayashi, Zushi; Kazuhiko Kameda, Yokohama, both of Japan

[73] Assignee: Asahi Glass Company Ltd., Tokyo, Japan

[*] Notice: The portion of the term of this patent subsequent to Apr. 10, 2007 has been disclaimed.

[21] Appl. No.: 501,789

[22] Filed: Mar. 28, 1990

Related U.S. Application Data

[63] Continuation-in-part of Ser. No. 248,086, Sep. 23, 1988, Pat. No. 4,916,472.

[30] Foreign Application Priority Data

| Sep. 25, 1987 | [JP] | Japan | 62-238981 |
| May 13, 1988 | [JP] | Japan | 63-114862 |
| Sep. 19, 1989 | [JP] | Japan | 1-240650 |

[51] Int. Cl.$^5$ .................................................. C08K 3/36
[52] U.S. Cl. .................................... 523/171; 523/500; 523/506; 523/514; 523/521
[58] Field of Search ............... 523/171, 500, 506, 514, 523/521

[56] References Cited

U.S. PATENT DOCUMENTS

| 4,139,578 | 2/1979 | Baughman et al. | 525/39 |
| 4,829,103 | 5/1989 | Oda et al. | 523/171 |
| 4,916,172 | 4/1990 | Hayashi et al. | 523/506 |

FOREIGN PATENT DOCUMENTS

58-189215  5/1989  Japan .................................. 523/171

*Primary Examiner*—Paul R. Michl
*Assistant Examiner*—Edward J. Cain
*Attorney, Agent, or Firm*—Oblon, Spivak, McClelland, Maier & Neustadt

[57] ABSTRACT

A reaction curable resin composition comprising a curable component, a polymerization initiator for curing the curable component, an inorganic filler and a phosphoric acid ester of methacrylic or acrylic acid having the formula:

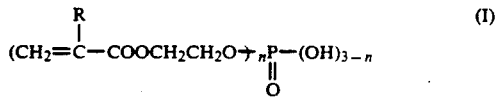

wherein R is H or $CH_3$, and n is 1 or 2, wherein the curable component comprises at least one monomer (A-1) selected from the group consisting of a polyfunctional allylcarbonate, an unsaturated polyester and (meth)acrylate, and/or a precondensate (A-2) obtained by partially polymerizing such monomer (A-1).

4 Claims, No Drawings

REACTION CURABLE RESIN COMPOSITION AND ARTIFICIAL MARBLE

This application is a continuation-in-part application of application Ser. No. 077/248,086 filed Sept. 23, 1988, now U.S. Pat. No. 4,916,472.

BACKGROUND OF THE INVENTION

1. Field of the Invention

The present invention relates of a reaction curable resin composition and an artificial marble obtained by molding and curing the composition. More particularly, the present invention relates to a reaction curable resin composition for the production of an artificial marble having high mechanical strength and excellent weather resistance and stain resistance and having an excellent processability, and an artificial marble obtained by molding and curing such a composition.

2. Discussion of Background

Heretofore, an artificial marble prepared by molding and curing a resin composition is practically employed for various applications including sanitary wares such as toilet tables, bath tabs or kitchen counters, and building interior or exterior materials. To obtain such an artificial marble in the form of a molded resin product, it is common to employ a casting method wherein a composition prepared by blending and mixing e.g. inorganic fillers or fibrous reinforcing material to a resin as matrix constituting the artificial marble is filled in a mold, followed by curing. Otherwise, a compression molding method is employed by using SMC (sheet-molding compound) which is prepared by blending inorganic fillers, a thickener and other additives to a resin, impregnating the blend to e.g. glass fibers and enclosing the impregnated glass fibers with a film to form a sheet, or BMC (bulk-molding compound) which is prepared in the same manner but in a bulk form.

The matrix resin used in such molding methods, is usually an unsaturated polyester resin. However, an artificial marble made of such a resin is more or less inferior in its appearance. For example, an artificial marble prepared by using an unsaturated polyester resin as matrix, has little transparency and thus has a drawback that an appearance due to transparency specific to marble can not be obtained. It has been proposed to overcome such a drawback (Japanese Unexamined Patent Publications No. 66462/1984 and No. 101552/1986).

On the other hand, reflecting an increasing demand for high quality, the artificial marble is required to have an appearance which gives a gorgeous impression with the internal patterns of the molded product to be seen through due to the transparency, to have mechanical strength such as flexural strength and impact strength and to have improved surface hardness or the heat resistant properties. Accordingly, an attention has been drawn to a methacrylate resin having good transparency and mechanical strength as such a matrix resin.

A number of proposals have been made with respect to an artificial marble or a composition for an artificial marble wherein a methacrylate resin is used as matrix. As basic proposals, a product obtained by curing a mixture of a methyl methacrylate polymer with an alumina hydrate (Japanese Examined Patent publication No. 22586/1975, U.S. Pat. No. 3,847,865) and a granite product composed of opaque or translucent particles of predetermined particle sizes wherein a methyl methacrylate polymer and alumina trihydrate particles are used as matrix (Japanese Unexamined Patent Publication No. 72707/1977 and U.S. Pat. No. 4,085,246), are known. Further, as proposals having a feature in the combination with a filler, it has been proposed, for example, to incorporate aluminum hydroxide (Japanese Examined Patent Publications No. 22586/1975 and No. 43222/1980), to incorporate a combination of aluminum hydroxide with either one of magnesium hydroxide, magnesium carbonate and aluminum oxide (Japanese Unexamined Patent Publication No. 104621/1978), to incorporate silica (Japanese Unexamined Patent Publication No. 4611/1981), and to incorporate calcium silicate (Japanese Unexamined Patent Publication No. 33308/1984). Further, a methacrylate resin composition containing a filler and having its fluidity during the molding improved, is also disclosed (Japanese Unexamined Patent Publication No. 245609/1985).

As described in the foregoing, the matrix resin is being changed from an unsaturated polyester resin to a methacrylate resin.

Further, an artificial stone molded product has also been proposed which is composed of a polymer of a composition comprising as matrix a polyfunctional allylcarbonate resin, preferably diethylene glycol bis(allylcarbonate) polymer, known as a resin having excellent transparency as well as high strength and abrasion resistance and fine powder of silica or alumina hydrate (Japanese Unexamined Patent Publication No. 111953/1986).

As described in the foregoing, the matrix resin for an artificial marble is desired to be a resin having excellent transparency so that the molded artificial marble will have an appearance which gives a gorgeous impression, and for this purpose, a methacrylate resin is generally regarded as a suitable resin. However, there is a problem that the methacrylate resin and filler are usually substantially different in various properties, and the resin and the filler have poor affinity or adhesion particularly due to the difference in their interfacial properties. Further, when the filler is incorporated, the viscosity increases by the incorporation, whereby it becomes extremely difficult to uniformly disperse the filler. Accordingly, there is a problem that it is difficult to improve the properties of the artificial marble or to reduce the cost by increasing the amount of the filler.

Consequently, the artificial marble thereby obtained has a drawback that the mechanical strength such as the flexural strength or impact strength is pratically inadequate. In order to overcome such drawback, it has been proposed that the filler is subjected to surface treatment, for example, with a silane coupling agent, and such a surface-treated filler is incorporated to a resin. However, no adequate effect has yet been obtained. Besides, an increase of the manufacturing cost is thereby unavoidable. Furthermore, no adequate stain resistance or chemical resistance will be obtained by such a means for improvement.

Similar problems exist in the case where a polyfunctional allylcarbonate having excellent transparency is used as the matrix resin. Namely, diethylene glycol bis(allylcarbonate) has poor affinity and adhesion to an inorganic filler. Accordingly, the inorganic filler is not adequately dispersed in the matrix resin, whereby it is extremely difficult to incorporate a substantial amount of the filler. Even when the filler is incorporated in a small amount, it is likely that the filler is non-uniformly present in the molded product as an artificial marble, whereby a gorgeous appearance is hardly obtainable. Besides, the mechanical strength tends to be low. For example, when being cut or drilled for processing, the molded product is likely to undergo breakage to form a defective product.

With a composition containing diethylene glycol bis(allylcarbonate) as the matrix resin, it is necessary to heat it to gradually raise the temperature to obtain a molded product, whereby an extremely long time is required.

SUMMARY OF THE INVENTION

In view of the above problems, the present inventors have conducted various studies and researches to obtain an artificial marble having excellent properties by incorporating an inorganic filler to a copolymer in which various polymerizable monomers capable of providing a transparent resin are used in combination, so that the drawback of a conventional artificial marble composed solely of a single resin matrix is complemented and the properties are improved as the synergistic effect.

Accordingly, it is an object of the present invention to provide a reaction curable resin composition useful for the preparation of an artificial marble in which an inorganic filler is uniformly dispersed in a resin matrix, which has an improved adhesion and which is thus excellent in the mechanical strength, the surface smoothness, the gloss, the stain resistance and the chemical resistance and has an appearance with a gorgeous impression and which has good processability, and to provide an artificial marble obtained by molding and curing such a composition.

The present invention provides a reaction curable resin composition comprising a curable component, a polymerization initiator for curing the curable component, an inorganic filler and a phosphoric acid ester of methacrylic or acrylic acid having the formula:

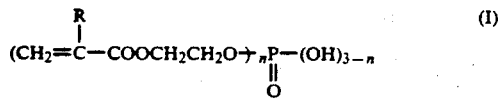

wherein R is H or CH$_3$, and n is 1 or 2, wherein the curable component comprises at least one monomer (A-1) selected from the group consisting of a polyfunctional allylcarbonate, an unsaturated polyester and (meth)acrylate, and/or a precondensate (A-2) obtained by partially polymerizing such monomer (A-1).

Now, the present invention will be described in detail with reference to the preferred embodiments.

The polyfunctional allylcarbonate monomer in the present invention is a monomer having at least two allylcarbonate groups

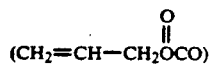

and a polyol residue. The polyol residue is derived from an aliphatic or alicyclic polyol having from 2 to 4 hydroxyl groups at least two hydroxyl groups. As such a polyol, ethylene glycol, diethylene glycol, triethylene glycol, dipropylene glycol, 1,4-butanediol, 1,6-hexanediol, glycerol or trimethylolpropane may be mentioned. A preferred polyol is an aliphatic diol, and particularly preferred is diethylene glycol. The most preferred polyfunctional allycarbonate monomer is diethylene glycol bis(allylcarbonate) represented by the formula:

This monomer is polymerized in the presence of a polymerization initiator to form a cured product having excellent transparency and high mechanical strength and abrasion resistance. Thus, this is presently used as a main material for plastic lenses. Further, it is possible to use a prepolymer obtained by preliminary partial polymerization of the monomer. This prepolymer is preferably the one obtained by the polymerization reaction of the monomer in the presence of a polymerization initiator to have a polymerization degree of from 1 to 100 poise (25° C. as measured by B model viscometer). Further, it is possible to use a mixture of this monomer and the prepolymer.

The unsaturated polyester in the present invention is a compound called also as alkyd resin which has at least several unsaturated groups. Preferably it is a polyester oligomer having an unsaturated polybasic acid residue, a saturated polybasic acid residue and a saturated polyol residue. Such polybasic acid residue and saturated polyol residue are preferably divalent, but may contain a small amount of a tri- or higher valent residue. As the unsaturated polybasic acid residue, a maleic acid residue or a fumaric acid residue is preferred. As the saturated polybasic acid residue, a residue of e.g. succinic acid, adipic acid, sebacic acid, orthophthalic acid, isophthalic acid or terephthalic acid is preferred. The polyol is preferably a diol such as ethylene glycol, diethylene glycol, propylene glycol, dipropylene glycol, 1,4-, 1,3- or 2,3-butanediol, neopentyl glycol or 1,6-hexanediol. Further, such a diol may be used in combination with a small amount of a tri- or higher valent polyol such as glycerol or trimethylol propane. By incorporating an unsaturated polyester to the above-mentioned polyfunctional allylcarbonate monomer or its precondensate, the curing rate of the polyfunctional allylcarbonate polymer or its precondensate can remarkably be accelerated.

In the present invention, a (meth)acrylate is a general term for a methacrylate and an acrylate. The (meth)acrylate as the curable component, may be a methacrylate which has commonly been used as a matrix resin for a composition of an artificial marble. More specifically, methyl acrylate, ethyl acrylate, methyl methacrylate, ethyl methacrylate, 2-ethylhexyl methacrylate, etc. may be employed. These (meth)acrylates may be used alone or in combination of two or more different types, as liquid monomers. Among them, methyl methacrylate is most preferred since it is readily available. Further, these monomers may preliminarily be partially polymerized for use as prepolymers. However, since they are useful also as diluents for the reaction for controlling the viscosity of the reaction curable composition, they are suitable for use in the form of monomers in combination with a polyfunctional allylcarbonate for an unsaturated polyester, as the curable component.

In the present invention, the monomer (A-1) selected from the group consisting of a polyfunctional allylcarbonate, a (meth)acrylate and an unsaturated polyester, and/or the polycondensate such monomer, constituting the above mentioned curable component, may be one type or a combination of two or more different types. In the case of a combination of two or more different types, some merits are observed during the molding and curing or in the artificial marble obtained by such molding and curing. For example, as mentioned above, a polyfunctional allylcarbonate monomer usually has a slow curing speed. However, when it is combined with an unsaturated polyester, the curing speed is remarkably improved. Further, the polyfunctional allylcarbonate or the (meth)acrylate monomer has a difficulty in the dispersibility of an inorganic filler. However, when it is combined with an unsaturated polyester monomer, this difficulty can be overcome. Further, when a (meth)acrylate monomer is combined with a polyfunctional allylcarbonate or an unsaturated polyester, it will be possible to obtain a function as a reaction diluent.

Thus, the curable component may comprise one monomer or a combination of at least two types of monomers (A-1), or a precondensate (A-2) obtained by partially polymerizing such monomer (A-1), as well as a combination of such monomer and precondensate. However, the curable component may preferably be a combination of two or more different types rather than a single type. In a combination of two types of curable materials, there is no particular restriction as to the respective proportion. However, they are preferably selected within a range of the weight ratio of from 10:0.1 to 10:50. If the weight ratio is outside this range, the composition tends to be substantially the same as one type, whereby the merits of the combination of two different types will be low. The above mentioned combination of two types of curable materials is common to the monomer and the precondensate.

In the case of a combination of three types of monomers, the following amounts are preferably employed. The proportions of the polyfunctional allylcarbonate monomer or its precondensate, the unsaturated polyester and the (meth)acrylate in the curable component of the present invention are such that the unsaturated polyester is from 10 to 490 parts by weight and the (metha)acrylate is from 10 to 490 parts by weight, relative to 100 parts by weight of the polyfunctional allylcarbonate monomer or its precondensate, and the total of the unsaturated polyester and the reactive diluent is from 300 to 500 parts by weight. If the proportions depart substantially from these ranges, the artificial marble obtained by molding and curing the reaction curable composition tends to be poor in the appearance and in the mechanical properties.

In the reaction curable resin composition of the present invention, it is important that a phosphoric acid ester of methacrylic or acrylic acid is contained in addition to the curable component, the polymerization initiator and the inorganic filler. Such a phosphoric acid ester is a compound having the following formula I:

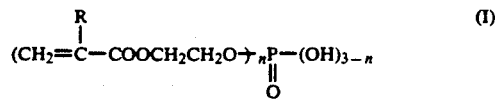

wherein R is H or CH$_3$, and n is 1 or 2. This compound is contained as an additional component to the reaction curable component or as a reactive diluent. By its presence in a small amount, the mechanical strength and particularly the post processability of the artificial marble obtained by molding and curing the reaction curable resin composition, will be substantially improved. The content of the compound is usually from 0.1 to 5% by weight, preferably from 0.5 to 3% by weight. If the content exceeds 5% by weight, no further effects can be expected. On the other hand, if the content is less than 0.1% by weight, the desired effects can hardly be obtainable.

With the reaction curable resin composition of the present invention, the viscosity can be increased even when the curable component is the above mentioned monomer (A-1), since it contains an inorganic filler. If the viscosity is too high, injection of the composition into a casting mold will be difficult at the time of molding the composition into an artificial marble by molding and curing. Besides, such tends to lead to a deterioration of the properties or the outer appearance of the molded polymer product i.e. the artificial marble due to incomplete defoaming. Accordingly, it is particularly preferred to incorporate the above mentioned phosphoric acid ester of methacrylic or acrylic acid also from the view point such that it is important to properly adjust the viscosity.

As the organic phosphoric acid ester, an alkyl phosphate of the formula:

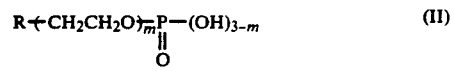

wherein R is an alkyl group having from 8 to 12 carbon atoms, and m is an integer of 1 or 2, may be used as a reactive diluent or as an additional component to adjust the viscosity of the reaction curable composition. This ester may be incorporated in an amount of from 0.1 to 5% by weight, preferably from 0.5 to 1% by weight, and by the combination with the compound of the above formula I, the properties of the artificial marble may further be improved.

Further, in order to improve the dispersibility of the organic filler or its adhesion with the resin, it is effective to incorporate, for example, a silane coupling agent or an inorganic filler treated with a silane coupling agent.

In order to mold and cure the reaction curable composition to obtain an artificial marble, the reaction curable composition contains a polymerization initiator. Specific examples of such a polymerization initiator include benzoyl peroxide (BPO), cumene hydroperoxide, t-butyl hydroperoxide, di-t-butyl peroxide, diisopropylperoxydicarbonate, di-n-propylperoxydicarbonate and di(2-ethylhexyl)peroxycarbonate. Particularly preferred is benzoyl peroxide or diisopropylperoxydicarbonate. Such a polymerization initiator is incorporated in an amount of from 0.5 to 10 parts by weight, preferably from 1 to 7 parts by weight, relative to 100 parts by weight of the curable component.

The reaction curable composition of the present invention contains an inorganic filler in addition to the above-mentioned curable component. Such an inorganic filler may be aluminum hydroxide, magnesium hydroxide, silica, calcium carbonate, calcium silicate, kaolin, clay, glass or talc which is commonly used in the conventional artificial marble. Among such inorganic fillers, aluminum hydroxide is preferred, since the artificial marble thereby obtained will have excellent chemical resistance, particularly against acidic solutions. Such as inorganic filler is preferably in a particle form, and the particle size of the filler is preferably at a level of an average particle size of from 0.6 to 50 μm. The smaller the particle size, the higher the whiteness of the artificial marble, but the light transmitting properties tend to decrease. Further, the smaller the particle size, the higher the viscosity with the same amount of incorporation, and the operation efficiency tends to be low. On the contrary, the larger the particle size, the lower the viscosity, and the amount of incorporation can be increased, but the dispersibility tends to be poor, and the precipitation of the filler tends to take place, thus leading to a deterioration of the physical strength of the artificial marble. Therefore, the particle size is preferably within a range of form 3 to 10 μm. And the amount of incorporation is from 30 to 90% by weight, based on the entire curable component. If the amount is less than 30% by weight, it becomes difficult to obtain a color tone as an artificial marble, and if it exceeds 90% by weight, uniform dispersion tends to be difficult.

To the reaction curable composition of the present invention, it is of course possible to incorporate fibrous materials such as glass fibers or other additives for the purpose of improving the moldability or the properties of the artificial marble.

The polymerization may be conducted at a temperatures of form 80° to 120° C. for from 2 to 4 hours. Preferably, the temperature is stepwise raised from a low temperature. The polymerization molding time can be made remarkably short as compared with the polymerization molding condition in the case where diethylene glycol bis(allylcarbonate) was used alone.

A conventional casting mold may be used as the mold to obtain the artificial marble. Further, other molds useful for continuous molding may be employed. There is no particular restriction as to the type of the mold.

Now, the present invention will be described in further detail with reference to Examples. However, it should be understood that the present invention is by no means restricted to such specified Examples.

EXAMPLES 1 TO 3

Diethylene glycol bis(allylcarbonate) ("CR-39", manufactured by PPG Company), an unsaturated polyester ("Upica 8639", manufactured by Nihon Upica Co. Ltd.) and methyl methacrylate, as monomers, aluminum hydroxide ("Hydilight H-320", average particle size: 3 μm, manufactured by Showa Denko K.K.) as an inorganic filler and benzoyl peroxide as a polymerization initiator, were blended in the proportions as identified in Table 1. Further, phosphoric acid ester of methacrylic acid ("JPA 514", manufactured by Johoku Kagaku Kogyo K.K.), an alkyl phosphoric acid ester ("Gafac RS-710", manufactured by Toho Chemical Co. Ltd.) as a viscosity-reducing agent and other additives were added in the proportions as identified in Table 1. The mixture was uniformly stirred and mixed and then defoamed to obtain a paste composition. The viscosity of this past composition was measured, and the results are shown Table 1.

Then, this paste composition was injected and filled into a mold assembled by reinforced glass sheets. After confirming that no remaining foams existed, the mold was put in an air oven at a temperature of 80° C., and it was then heated to a temperature of 100° C. over a period of two hours and further to 120° C. over a period of two hours, and then maintained at 120° C. for one hour for polymerization, molding and curing.

The mold was taken out from the air oven, cooled and then disassembled to obtain an artificial marble of 50 cm×50 cm ×12 mm in thickness as the molded polymer product.

The following properties were measured with respect to the artificial marble thus obtained. The results are shown in Table 1.

As the mechanical strength, the flexural strength and the flexural modulus were measured in accordance with JIS K-7203, the Izod impact strength (notched) was measured in accordance with JIS K-7110, the Barcole hardness (GYZJ 934-1) was measured, and the surface appearance was visually inspected. With respect to the processability, drilling of a hole having a diameter of 10 mm was conducted by a drilling machine, and cutting was conducted by a band sawing machine using a diamond saw, and the appearance of the processed surfaces was visually inspected.

COMPARATIVE EXAMPLES 1 TO 3

A paste composition blended in the proportions as identified in Table 1 was prepared in the same manner Examples 1 to 3 except that in Examples 1 to 3, the phosphoric acid ester of methacrylic acid and the alkyl phosphate were not added. This composition was introduced into an air oven heated to 80° C., and it was then heated to a temperature of 100° C. over a period of two hours and further to 120° C. over a period of 4 hours, and maintained at 120° C. for two hours for polymerization, molding and curing to obtain an artificial marble as a molded polymer product.

The physical properties of the artificial marble thus obtained were measured, and the results are shown in Table 1.

TABLE 1

| | | | Examples | | | Comparative Examples | | |
|---|---|---|---|---|---|---|---|---|
| | | | 1 | 2 | 3 | 1 | 2 | 3 |
| Composition (parts by weight) | Diethylene glycol bis(allylcarbonate) | | 350 | — | — | 350 | — | — |
| | Unsaturated polyester | | — | 350 | — | — | 350 | — |
| | Methylmethacrylate | | — | — | 350 | — | — | 350 |
| | Aluminum hydroxide | | 650 | 650 | 650 | 650 | 650 | 650 |
| | Benzoyl peroxide | | 10.5 | 10.5 | 10.5 | 10.5 | 10.5 | 10.5 |
| | Phosphoric acid ester of 2-hydroxyethyl methacrylate | | 6.5 | 6.5 | 6.5 | — | — | — |
| | Alkyl phosphate | | 3.2 | 3.2 | 3.2 | — | — | — |
| | Silane coupling agent | | — | — | — | 65 | 65 | 65 |
| | Tinuvin (ultraviolet absorber) | | 3.5 | 3.5 | 3.5 | 3.5 | 3.5 | 3.5 |
| | ByK (defoaming agent) | | 5 | 5 | 5 | 5 | 5 | 5 |
| Viscosity (cps. 25° C.) | | | 2500 | 3000 | 2100 | 15000 | 20000 | 11000 |
| Properties | Mechanical properties | Flexural strength (kgf/mm$^2$) | 7.5 | 5.8 | 7.1 | 5.3 | 3.9 | 5.1 |
| | | Flexural | 850 | 920 | 1050 | 780 | 810 | 980 |

TABLE 1-continued

|  |  | Examples | | | Comparative Examples | | |
| --- | --- | --- | --- | --- | --- | --- | --- |
|  |  | 1 | 2 | 3 | 1 | 2 | 3 |
|  | modulas (kgf/mm$^2$) |  |  |  |  |  |  |
|  | Izod impact (notched) (kgf/mm$^2$) | 2.0 | 1.5 | 1.8 | 1.2 | 0.9 | 1.1 |
|  | Izod impact (unnotched) (kgf/mm$^2$) | 10.3 | 8.5 | 9.6 | 5.7 | 3.8 | 5.0 |
|  | Tensile strength (kgf/mm$^2$) | 5.1 | 5.0 | 6.2 | 3.8 | 3.2 | 4.0 |
| Barcole hardness |  | 65 | 65 | 65 | 60 | 60 | 62 |
| Appearance |  | Good | Good | Good | Bubbles remained due to effective defoaming | Good | Good |
| Processability |  | Good | Good | Good | Slightly brittle, Break off observed | Slightly brittle, Break off observed at end portions | Slightly brittle, Break off observed at end portions |

EXAMPLES 4 to 9

A paste composition blended in the proportions as identified in Table 2 was prepared in the same manner as in Examples 1 to 3 except that the monomers used in Examples 1 to 3 were combined in the proportions as identified in Table 2. This composition was introduced into an air oven heated to 80° C., and it was heated to 120° C. 100° C. over a period of two hours and further to 120° C. over a period of two hours, and then maintained at 120° C. for 30 minutes for polymerization, molding and curing to obtain an artificial marble as a molded polymer product.

The properties of the artificial marble thus obtained were measured, and the results are shown in Table 2.

TABLE 2

|  |  |  | Examples | | | | | |
| --- | --- | --- | --- | --- | --- | --- | --- | --- |
|  |  |  | 4 | 5 | 6 | 7 | 8 | 9 |
| Composition (parts by weight) | Diethylene glycol bis(allylcarbonate) |  | 300 | 70 | 280 | 50 | — | — |
|  | Unsaturated polyester |  | 50 | 280 | — | — | 280 | 50 |
|  | Methylmethacrylate |  | — | — | 70 | 300 | 70 | 300 |
|  | Aluminum hydroxide |  | 650 | 650 | 650 | 650 | 650 | 650 |
|  | Benzoyl peroxide |  | 10.5 | 10.5 | 10.5 | 10.5 | 10.5 | 10.5 |
|  | Phosphoric acid ester of 2-hydroxyethyl methacrylate |  | 6.5 | 6.5 | 6.5 | 6.5 | 6.5 | 6.5 |
|  | Alkyl phosphate |  | 3.2 | 3.2 | 3.2 | 3.2 | 3.2 | 3.2 |
|  | Tinuvin (ultraviolet absorber) |  | 3.5 | 3.5 | 3.5 | 3.5 | 3.5 | 3.5 |
|  | ByK (defoaming agent) |  | 5 | 5 | 5 | 5 | 5 | 5 |
| Viscosity (cps. 25° C.) |  |  | 2800 | 3000 | 2200 | 2000 | 2500 | 2200 |
| Properties | Mechanical properties | Flexural strength (kgf/mm$^2$) | 7.8 | 6.5 | 7.5 | 7.7 | 6.4 | 7.2 |
|  |  | Flexural modulas (kgf/mm$^2$) | 900 | 910 | 980 | 1020 | 950 | 960 |
|  |  | Izod impact (notched) (kgf/mm$^2$) | 1.9 | 1.8 | 2.5 | 2.2 | 1.8 | 1.8 |
|  |  | Izod impact (unnotched) (kgf/mm$^2$) | 10.5 | 9.5 | 11.2 | 10.7 | 9.8 | 10.2 |
|  |  | Tensile strength (kgf/mm$^2$) | 5.5 | 5.2 | 6.2 | 6.5 | 5.2 | 6.0 |
|  | Barcole hardness |  | 64 | 63 | 65 | 65 | 63 | 65 |
|  | Appearance |  | Good | Good | Good | Good | Good | Good |
|  | Processability |  | Good | Good | Good | Good | Good | Good |

COMPARATIVE EXAMPLES 4 TO 6

A paste composition blended in the proportions as identified in Table 3, was prepared in the same manner as in Examples 4, 6 and 8 except that in Examples 4, 6 and 8, the phosphoric acid ester of methacrylic acid and the alkyl phosphate were not added. This composition was polymerized, molded and cured in the same manner as in Comparative Examples 1 to 3 to obtain an artificial marble as the molded polymer product.

The properties of the artificial marble thus obtained were measured, and the results are shown in Table 3.

TABLE 3

| | | Comparative Examples | | |
|---|---|---|---|---|
| | | 4 | 5 | 6 |
| Composition (parts by weight) | Diethylene glycol bis(allylcarbonate) | 350 | 280 | — |
| | Unsaturated polyester | 50 | — | 280 |
| | Methylmethacrylate | — | 70 | 70 |
| | Aluminum hydroxide | 650 | 650 | 650 |
| | Benzoyl peroxide | 10.5 | 10.5 | 10.5 |
| | Silane coupling agent | 65 | 65 | 65 |
| | Tinuvin (ultraviolet absorber) | 3.5 | 3.5 | 3.5 |
| | ByK (defoaming agent) | 5 | 5 | 5 |
| Viscosity (cps. 25° C.) | | 20000 | 12000 | 18000 |
| Properties | Mechanical properties | Flexural strength (kgf/mm$^2$) | 5.0 | 5.5 | 4.2 |
| | | Flexural modulas (kgf/mm$^2$) | 790 | 820 | 900 |
| | | Izod impact (notched) (kgf/mm$^2$) | 1.2 | 1.2 | 1.0 |
| | | Izod impact (unnotched) (kgf/mm$^2$) | 5.5 | 6.2 | 4.1 |
| | | Tensile strength (kgf/mm$^2$) | 3.9 | 4.2 | 4.0 |
| | Barcole hardness | | 60 | 62 | 60 |
| | Appearance | | Bubbles remained due to | Bubbles remained due to | Bubbles remained due to |
| | Processability | | effective defoaming Slightly brittle, Break off observed | effective defoaming Slightly brittle, Break off observed | effective defoaming Slightly brittle, Break off observed |

EXAMPLES 10 TO 13

In Examples 1, 4, 5 and 6, the diethylene glycol bis(allylcarbonate) was, after an addition of a polymerization initiator to this monomer, preliminarily heat-treated at 80° C. for preliminary polymerization to obtain a partial condensate, and other components were blended in the proportions as identified in Table 4, to obtain a composition. In the same manner as in Example 1, 4, 5 and 6, this composition was heated to 80° C. over a period of one hour and further to 120° C. over a period of one hour, and then maintained at 120° C. for 30 minutes for polymerization, molding and curing to obtain an artificial marble as a molded polymer product.

The properties of the artificial marble thus obtained were measured, and the results are shown in Table 4.

EXAMPLES 14 and 15

In Examples 7 and 9, the methyl methacrylate monomer was, after an addition of a polymerization initiator, preliminarily polymerized to obtain a syrup as a prepolymer having a viscosity of 800 CPS (25° C.), and other components were blended thereto in the proportions as identified in Table 4 to obtain a composition. In the same manner as in Examples 7 and 9, this composition was maintained at 120° C. for one hour for polymerization, molding and curing to obtain an artificial marble as a molded polymer product.

The properties of the artificial marble thus obtained were measured, and the results are shown in Table 4.

TABLE 4

| | | | Examples | | | | | |
|---|---|---|---|---|---|---|---|---|
| | | | 10 | 11 | 12 | 13 | 14 | 15 |
| Composition (parts by weight) | Diethylene glycol bis(allylcarbonate) | | 350 | 300 | 70 | 280 | 50 | — |
| | Unsaturated polyester | | — | 50 | 280 | — | — | 50 |
| | Methylmethacrylate | | — | — | — | 70 | 300 | 300 |
| | Aluminum hydroxide | | 650 | 650 | 650 | 650 | 650 | 650 |
| | Benzoyl peroxide | | 10.5 | 10.5 | 10.5 | 10.5 | 10.5 | 10.5 |
| | Phosphoric acid ester of 2-hydroxyethyl methacrylate | | 6.5 | 6.5 | 6.5 | 6.5 | 6.5 | 6.5 |
| | Alkyl phosphate | | 3.2 | 3.2 | 3.2 | 3.2 | 3.2 | 3.2 |
| | Tinuvin (ultraviolet absorber) | | 3.5 | 3.5 | 3.5 | 3.5 | 3.5 | 3.5 |
| | ByK (defoaming agent) | | 5 | 5 | 5 | 5 | 5 | 5 |
| Properties | Mechanical properties | Flexural strength (kgf/mm$^2$) | 7.3 | 7.8 | 7.7 | 8.2 | 7.5 | 7.5 |
| | | Flexural modulas (kgf/mm$^2$) | 780 | 820 | 890 | 850 | 1050 | 1100 |
| | | Izod impact (notched) (kgf/mm$^2$) | 1.8 | 2.0 | 1.8 | 2.0 | 2.0 | 1.8 |
| | | Izod impact (unnotched) | 10.2 | 11.5 | 10.5 | 11.3 | 10.6 | 9.9 |

TABLE 4-continued

|  |  | Examples | | | | | |
|---|---|---|---|---|---|---|---|
|  |  | 10 | 11 | 12 | 13 | 14 | 15 |
|  | (kgf/mm²) Tensile strength (kgf/mm²) | 5.5 | 6.2 | 5.8 | 6.5 | 6.1 | 5.9 |
|  | Barcole hardness | 64 | 65 | 65 | 65 | 65 | 65 |
|  | Appearance | good | good | good | good | good | good |
|  | Processability | good | good | good | good | good | good |

EXAMPLES 16 TO 18

By using the same starting materials as used in Examples 1 to 3, artificial marbles having the compositions as identified in Table 5 were obtained.

The properties of the artificial marbles thus obtained are shown in Table 5. As additional properties, the processability was examined by drilling and cutting, whereby the production of defective products was ascertained. The results are shown in Table 5.

TABLE 5

|  |  |  | Examples | | |
|---|---|---|---|---|---|
|  |  |  | 16 | 17 | 18 |
| Composition (parts by weight) | Diethylene glycol bis(allyl-carbonate) |  | 140 | 210 | 100 |
|  | Unsaturated polyester |  | 140 | 70 | 50 |
|  | Methyl-methacrylate |  | 70 | 70 | 200 |
|  | Aluminum hydroxide |  | 650 | 650 | 650 |
|  | Phosphoric acid ester of 2-hydroxyethyl methacrylate |  | 6.5 | 6.5 | 6.5 |
|  | Alkyl phosphate |  | 3.2 | 3.2 | 3.2 |
|  | Benzoyl peroxide |  | 10.5 | 10.5 | 10.5 |
|  | Tinuvin (ultraviolet absorber) |  | 3.5 | 3.5 | 3.5 |
|  | ByK (defoaming agent) |  | 5 | 5 | 5 |
| Viscosity (cps. 25° C.) |  |  | 5000 | 1800 | 700 |
| Properties | Mechanical properties | Flexural strength (kgf/mm²) | 6.0 | 7.7 | 6.0 |
|  |  | Flexural modulus (kgf/mm²) | 800 | 830 | 800 |
|  |  | Izod impact (notched) (kgf/mm²) | 1.5 | 1.8 | 1.3 |
|  |  | Izod impact (un-notched) (kgf/mm²) | 7.0 | 10.0 | 6.5 |
|  |  | Tensile strength (kgf/mm²) | 4.0 | 4.3 | 4.0 |
|  | Barcole hardness |  | 65 | 65 | 65 |
|  | Appearance |  | Good | Good | Good |
|  | Processability |  | Good | Good | Good |

The artificial marble obtained by molding and curing the reaction curable composition of the present invention has features that the dispersion of the inorganic filler in the matrix resin is excellent and accordingly it has a high level of whiteness, a light transmittance and an appearance similar to natural marble. As compared with conventional artificial marbles, it is excellent not only in the mechanical strength but also in the stain resistance, chemical resistance and processability, and thus suitable for use in a wide range of applications. Further, the polymerization of the reaction curable composition of the present invention to prepare an artificial marble can be remarkably shortened as compared with e.g. the polymerization of a composition containing diethylene glycol bis(allylcarbonate) as the sole curable component.

Further, as an effect obtainable by the incorporation of the phosphoric acid ester of methacrylic or acrylic acid, it is observed that such an ester promotes the molding and curing by the polymerization of a polyfunctional allylcarbonate as a curable component.

What is claimed is:

1. A reaction curable resin composition comprising a curable component, a polymerization initiator for curing the curable component, an inorganic filler and a phosphoric acid ester of methacrylic or acrylic acid having the formula:

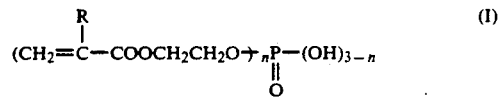

(I)

wherein R is H or $CH_3$, and n is 1 or 2, wherein the curable component comprises at least one monomer selected from the group consisting of a polyfunctional allylcarbonate, an unsaturated polyester and (meth)acrylate, or a precondensate obtained by partially polymerizing such monomer.

2. The reaction curable resin composition according to claim 1, wherein the phosphoric acid ester of methacrylic or acrylic acid of the formula I is in an amount of from 0.5 to 5% by weight relative to the inorganic filler.

3. The reaction curable resin composition according to claim 1, wherein the inorganic filler is at least one member selected from the group consisting of aluminum hydroxide, magnesium hydroxide, calcium carbonate and silica.

4. An artificial marble obtained by molding and curing the reaction curable resin composition according to claim 1.

* * * * *